June 20, 1950 — A. E. GULL — 2,512,272

POWER TRANSMISSION MECHANISM

Filed Feb. 16, 1949 — 4 Sheets-Sheet 1

Adolphe Ewald Gull
Inventor

By Richardson and Davis
Attorneys.

June 20, 1950          A. E. GULL          2,512,272

POWER TRANSMISSION MECHANISM

Filed Feb. 16, 1949          4 Sheets-Sheet 3

Inventor
Adolphe Ewald Gull
By Richardson and David
Attorneys.

Patented June 20, 1950

2,512,272

UNITED STATES PATENT OFFICE 2,512,272

POWER TRANSMISSION MECHANISM

Adolphe Ewald Gull, London, England

Application February 16, 1949, Serial No. 76,701
In Great Britain July 20, 1948

23 Claims. (Cl. 74—63)

This invention relates to power transmission mechanisms and has for its main object to provide a transmission mechanism which will automatically regulate the transmission ratio between a driving and a driven shaft in accordance with load variations.

A further object is to provide a power transmission mechanism which will act as a safety coupling, preventing overload.

According to the present invention a power transmission mechanism includes in combination a driving member co-axial with a driven member, said driving and driven members having adjacent surfaces of revolution around each of which extends an endless track made up of a number of contiguous curved sections, subtending equal angles at the centre of revolution, the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a number of transmission members each engaging with the tracks on both surfaces.

The transmission members may be spaced apart by distances equal to the pitch of the curves or to a multiple of said pitch.

Preferably the curves are half cycloids and each transmission member may be in the form of a ball.

In order to obtain maximum transmission efficiency the masses of the driving and driven members should be kept as small as possible and the masses of the transmission members should be made as large as possible.

However, since the centripetal acceleration of the transmission members would be of order of between 1000 g and 2000 g it will be understood that considerable power can be transmitted while employing transmission members of relatively small mass.

In order to increase the mass of the transmission members, the latter may be in the form of balls or rollers mounted in a cage, and the cage may be weighted. Further, radially movable weights may be attached to the cage and means provided for adjusting the radial positions of the weights during rotation of the parts.

In order to explain the invention more fully, three constructions according thereto will now be described by way of example with reference to the accompanying drawings in which.

In the drawings like reference indicates the same or similar parts.

In the construction illustrated in Figures 1 to 6 the mechanism comprises a casing 1 having a boss 2 for attachment to a driven shaft, the casing having a removable cover plate 3 attached to the casing by screws 4 and through which the driving shaft 5 freely passes, the end 6 of the driving shaft being freely supported within the boss 2.

Figure 3:
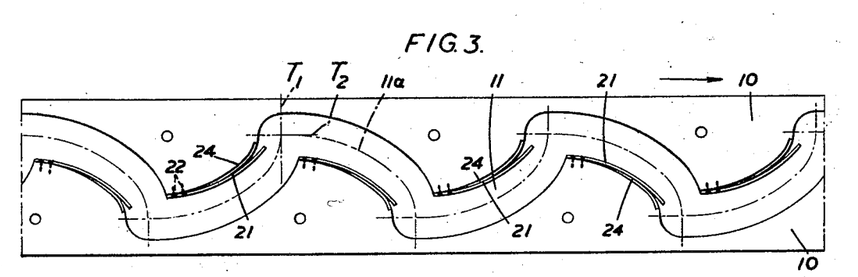
Figure 3 shows the development of the surface of revolution of the driving member illustrating the shape of the groove therein.

Attached to the driving shaft 5 by a key 7 is a sleeve 8 and connected to said sleeve 8 by a number of radial blade springs 9 is a driven member which is in the form of a ring 10, in the outer surface of which is formed a groove or track 11 of which the shape is illustrated in Figure 3 and described below.

The inner ends of the blade springs 9 are housed in slots 12 formed in the periphery of the sleeve 8 and the outer ends of springs 9 are housed in slots 13 formed on the inner periphery of the ring 10.

The driven member is in the form of a ring which is made up of three parts, namely, a complete outer ring 14 and two inner rings 15 and 16 which define between them the groove or track 17 of the driven member.

The outer ring 14 is secured to the internal periphery of the casing 1 by screws 18 and the two inner rings 15 and 16 are secured to the outer ring 14 by screws 19.

Figure 4:
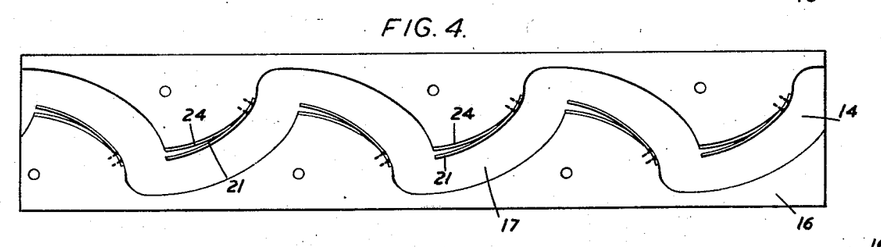
Figure 4 shows the development of the surface of revolution of the driven member illustrating the shape of the groove therein.

It will be seen that the outer ring 14 forms a support to which the two inner rings 15 and 16 are attached at a distance apart such that, as shown in Figure 4, they define between them the groove 17 thereby obviating the tedious process of cutting the groove 17 on the internal surface of a single ring and making it possible to assemble the balls.

Referring now to the shape of the grooves 11 and 17, the groove 11 is made up of six contiguous sections the center line 11a of each of which sections is a central projection of a half cycloid lying on an imaginary cylinder concentric with the driving ring 10 and having a diameter which is the mean of the external diameter of the driving ring 10 and of the internal diameter of the composite driven ring 14, 15, 16, the half cycloids being so relatively disposed that the tangent to each half cycloid at one end thereof is at right angles to the edge of the imaginary cylinder and the tangent of said half cycloid at the other end thereof is parallel to the edge of said imaginary cylinder as indicated diagrammatically at $T_1$ and $T_2$ in Figure 3.

The groove 17 of the composite driven ring 14, 15, 16 is made up of six contiguous sections the center line of each section being also a central projection of the half cycloid referred to above.

It will be understood that the center line of each section of the grooves 11 and 17 approximates to a half cycloid and each groove section will accordingly be referred to as a half cycloid throughout the specification and claims, the expression "half cycloid" including the central projections referred to above.

The groove 17 is produced by forming the required curves on the facing edges of the two rings 15 and 16, then attaching these to the supporting ring 14 at the required distance apart. The transmission members are in the form of balls 20, there being one ball to each section of the groove, that is to say six balls in all.

Figure 5:
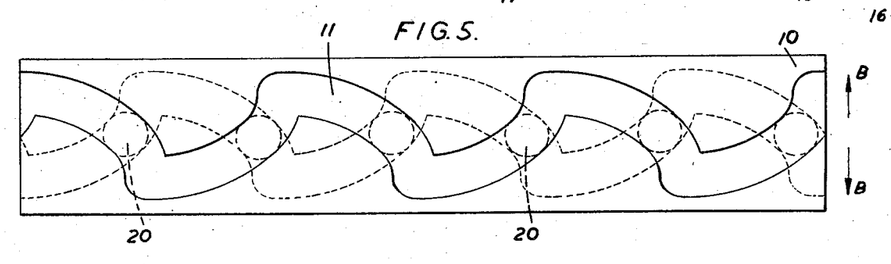
Figure 5 is a diagram showing the two grooves superimposed, the transmission balls being also indicated thereon.
Figure 6:
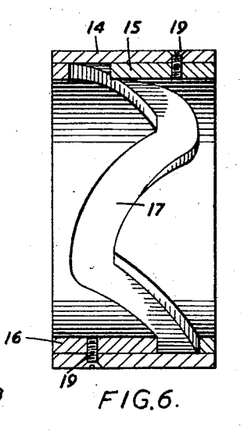
Figure 6 shows the driven member in section.

As shown diagrammatically in Figure 5 each ball 20 engages with both the groove 11 and the groove 17 at a point where the latter cross when the device is assembled with the ring 10 inside the composite ring 14, 15, 16.

When the driving shaft 5 is rotated from a source of power it will transmit rotation through the member 8 and blade springs 9 to the driving ring 10 and if the direction of rotation be such that, as indicated by the arrow in Figure 3, the convex side of each half cycloidal section of the groove is leading then the balls 20 will be moved along the cycloidal track 17 in the composite driven ring 14, 15 and 16, and will exert a component force on the driven ring in the direction of rotation of the driving ring and will thereby transmit power to said driven ring and cause it to rotate.

The power thus transmitted is proportional to the mass of the balls which are consequently made as heavy as possible.

As the rings rotate the balls reciprocate back and forth across the peripheries of the rings in a direction parallel to their axes as indicated by the arrows B in Figure 5, while simultaneously progressing around said peripheries.

At the junction of one half cycloidal section with the next, the tangent to the center line of one half cycloidal section is at right angles to the tangent to the center line of the contiguous half cycloidal section and in order to ensure a smooth passage of each ball past this junction the driving ring 10 is connected to the driving shaft 5 through a resilient connection constituted by the blade springs 9 described above.

As each ball 20 reaches the junction the element 8, from which the driving ring 10 is driven, overtakes said driving ring at which moment the blade springs 9 accelerate the driving ring 10 and urge the balls into the contiguous end of the respective next half cycloidal groove or track section.

It will be understood that the peripheral speed of the driving ring 10 is greater than the speed of travel of the balls around this ring, and that the peripheral speed of the driven ring 14, 15, 16 is less than the speed of travel of the balls.

As a precaution, in case any ball might tend to perform a retrograde movement at a junction between two contiguous half cycloidal track sections, a non-return element is provided in each half cycloidal track section at a point over which each ball passes just before arriving at a junction. In the illustrated construction such non-return member is in the form of a leaf spring 21 secured to the convex face of the track section by screws 22 the springs 21 normally standing in the positions shown in Figures 3 and 4 and each spring being pressed by the passage of the ball travelling past it into a recess 24 formed in the convex face of the track.

After a ball has passed the spring 21 the latter springs out of the recess 24 into the position shown in Figure 3 and effectively nullifies any tendency of the ball to move back.

Since the direction of travel of the balls relative to the driving ring 10 is opposite from the direction of travel of the balls relative to the driven ring, 14, 15, 16, the springs 21 on the driving ring face in the opposite direction from that in which the spring 21 on the driven ring face.

In the construction illustrated in the drawings six balls 20 are provided spaced apart by the pitch of the half cycloidal track sections and if it is desired to reduce the total mass of the balls, and thereby the power transmitted, alternate balls may be omitted in which case the balls would be spaced apart by twice the pitch of the half cycloidal sections.

In assembling the device the sleeve 8 is first keyed to the driving shaft 5 and the blade springs 9 are inserted in the slots 12 so that they project radially around the sleeve 8.

Figure 1:
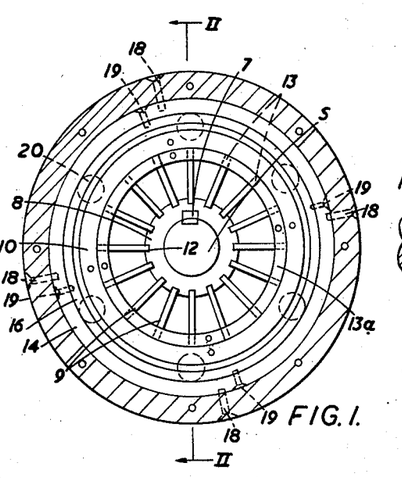
Figure 1 is an end elevation of one construction of transmission mechanism according to the invention shown in section on the line I—I of Figure 2.
Figure 2:
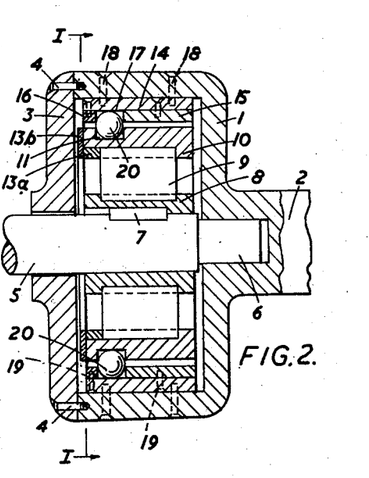
Figure 2 is a section on the line II—II of Figure 1.

The driving ring 10 is then pushed over the springs 9 from the right in Figure 2 with the slots 13 on the inside surface of the driving ring 10 in engagement with the outer ends of said springs. The left hand ends of the slots 13 are then closed by a ring 13a inserted from the left and held in position by a retaining ring 13b. The balls 20 are then placed in the respective track sections of the groove 11 formed on the outside surface of the ring 10. Thereafter the outer ring 14 with the inner ring 15 attached thereto is pushed on over the ring 10 and the other ring part 16 is pushed on from the opposite side and is attached to the outer ring 14. The assembly is then inserted into the casing with the shaft end 6 engaging in the bearing formed to receive it in the boss 2 and the outer ring 14 is secured to the casing 1 by the screws 18 after which the cover plate 3 is pushed on over the shaft 5 and secured to the casing 1 by the screws 4.

In order to increase the effective mass of the balls the latter may be mounted in a cage which may be heavy or weighted as described below with reference to Figures 7 to 9.

Figure 7:
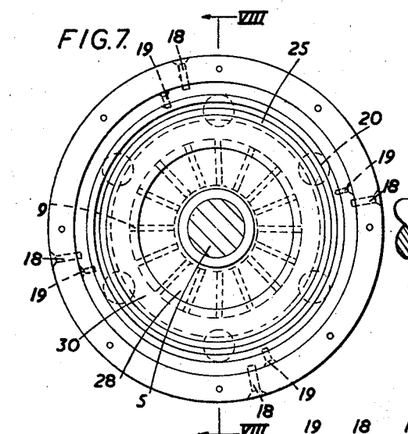
Figure 7 is an end elevation of an alternative construction with the cover plate removed.
Figure 8:
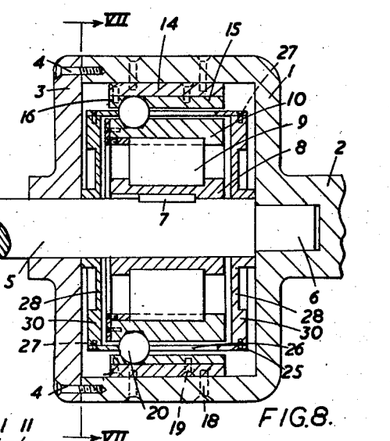
Figure 8 is a section on the line VIII—VIII in Figure 7, but with the cover plate in position.
Figure 9:
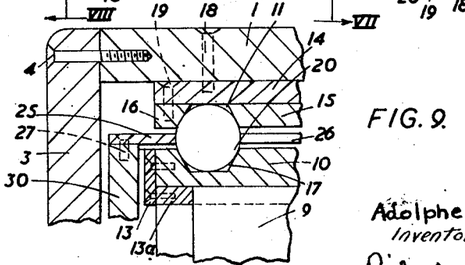
Figure 9 is a detail view to an enlarged scale of part of Figure 8.

The construction shown in Figures 7 to 9 is similar to that shown in Figures 1 to 6 except that the balls 20 are carried in a ball cage 25 in the form of a ring having six transverse slots 26, one for each ball, these slots being spaced around the periphery of the ring at distances apart corresponding to the pitch of the half-cycloidal track sections 11 and 17. The ring 25 is secured at its edges by screws 27 to two discs 28, one at each side.

The rings 28 are freely mounted on the shaft 5 and, towards their outer edges, they are thickened at 30 whereby the mass associated with, and moving with the balls 20 is increased. This mass can be made of any desired value within limits by altering the size of the parts 30.

Figures 10 to 16 illustrate a further construction including means for varying the radial position of masses rotating with the transmission members which, in this construction, are in the form of rollers mounted in a cage.

In the construction shown in Figures 10 to 16, the mechanism comprises the driving shaft 5 to which is keyed the sleeve 8 connected by the blade springs 9 to the driving member 10 having the groove or track 11 made up of six contiguous half cycloidal sections.

The mechanism also includes the driven ring made up of the three parts 14, 15 and 16 of which the latter define between them the groove or track 17 also made up of six half cycloidal sections.

In this construction, however, the transmission members are in the form of rollers 34 carried in a cage 31 in the form of a ring formed with transverse slots 32 in each of which engages one of the rollers 34. Each roller 34 has an axial pin 35, 36 projecting from each side face thereof and freely mounted on each pin is a roller 37, 38, of which the roller 37 engages the groove 11 in the driving ring 10 while the roller 38 engages the groove 17 in the driven ring 14, 15, 16.

Figure 16:
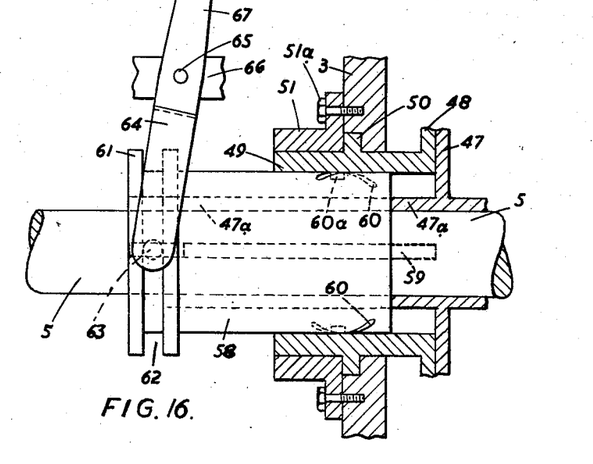
Figure 16 is a detail view to an enlarged scale of part of Figure 11.

The right hand edge of the cage 31 (Figure 11) is secured by screws 40 passing through holes 33 in said edge (Figure 15) and entering tapped holes in an outturned flange 41 of a supporting plate 42 (Figure 11) freely mounted on the shaft 5. The left hand edge of the cage 31 is secured by screws 43 passing through holes 44 in said edge and entering tapped holes 45 in legs 46 formed on a plate 47 likewise freely mounted on the shaft 5. The plate 47 extends beyond the ring 31 almost to the inside surface of the casing 1 and closely adjacent to the plate 47 is an outer plate 48 integral with a sleeve 49 provided with a collar 50 engaging in a peripheral groove in the end plate 3 for the casing 1, said groove being closed by a ring 51 attached to the outside face of the end plate 3 by screws 51a (Figure 16).

The inner plate 47 is formed with six equally spaced radial slots 52 and the outer plate 48 is formed with six equally spaced logarithmic spiral slots 54 of which the angle is 45° to a radius of the plate 48.

Passing through each radial slot 52 of the inner plate 47 and through the corresponding logarithmic spiral slot 54 in the outer plate 48 is a pin 55 of which the inner end has a head 58 while the outer end is attached to a weight 57.

It will thus be seen that if the outer plate 48 is rotated relatively to the inner plate 47, the pins 55 will be moved along the radial slots 52 by the cam action of the logarithmic spiral slots 54 so that the distance of the weights 57 from the center of the shaft 5 and therefore their centripetal acceleration can be varied.

In order to rotate the plate 48 relative to the plate 47 while both the plates 47 and 48 are rotating with the cage 31, the plate 47 has an integral sleeve 47a around which is disposed a sleeve 58 which is connected to the sleeve 47a by splines 59 so that it rotates with the sleeve 47a but can be moved axially along it. The sleeve 58 has formed in its outer periphery one or more 45° helical threads 60 with each of which engages a dog, such as 60a, formed on the inside face of the sleeve 49 (Figure 16).

If the sleeve 58 is moved axially of the shaft 5 the sleeve 49 will be rotated about the sleeve 58 and will carry with it the outer plate 48 thereby adjusting the radial positions of the weights 57.

In order to effect axial movement of the sleeve 58 the latter carries at its outer end a grooved collar 61 the groove 62 of which engages the pins 63 of a conventional forked lever 64 pivoted at 65 to a fixed part 66 of the apparatus and carrying a hand-operated lever 67, any desired means such as a pawl and ratchet being employed to hold the lever against movement in either direction from the position to which it has been set.

In the construction shown in Figures 10 to 16, the plates 47, 48 extend radially beyond the cage 31 and in order to permit the heads 56 of pins 55 to pass the cage 31, the edge of the latter is slotted as indicated at 70.

Figures 10, 11:
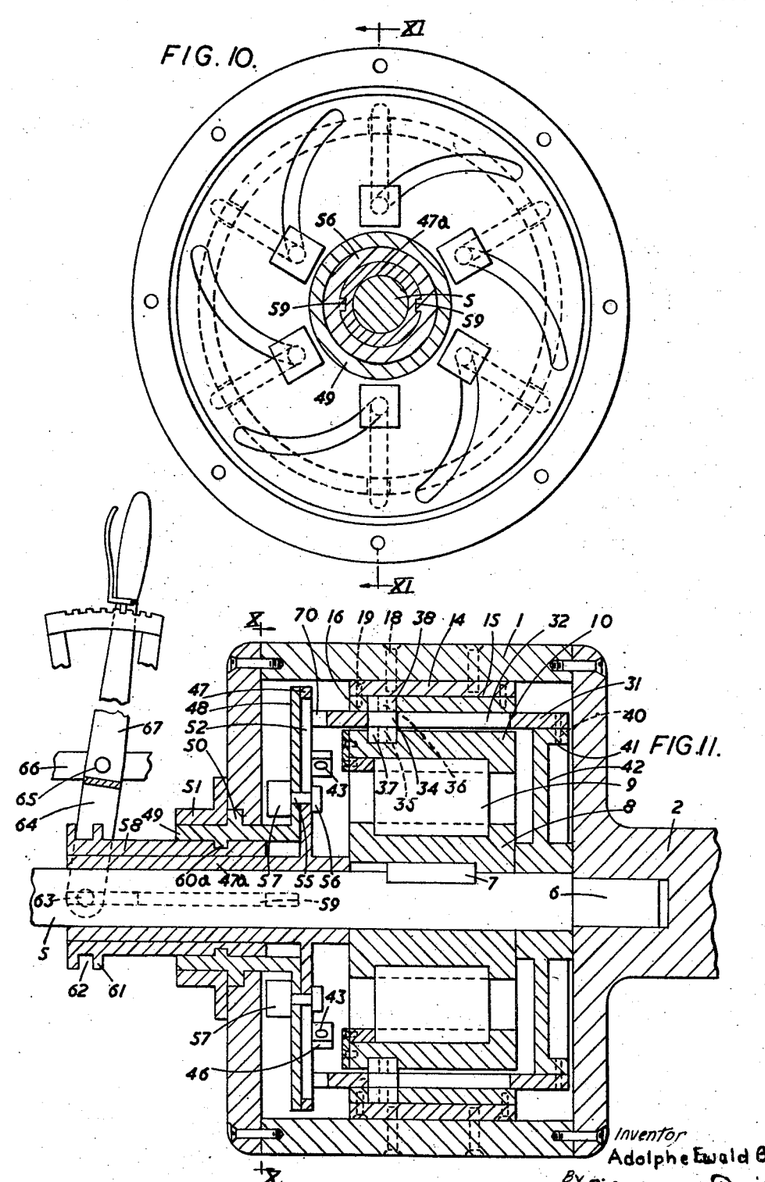
Figure 10 is an end elevation of a further modification in section on the line X—X in Figure 11.
Figure 11 is a view in section on the line XI—XI in Figure 10.
Figure 12:
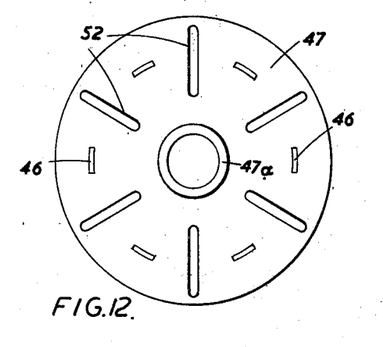
Figures 12 to 15 illustrate details of the construction shown in Figures 10 and 11.
Figure 13:
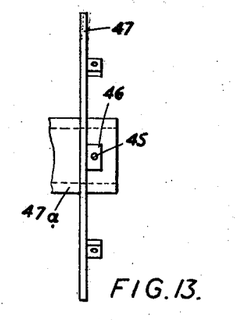
Figure 14:
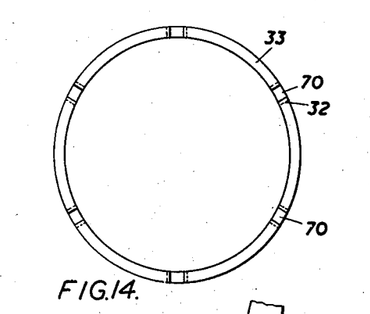
Figure 15:
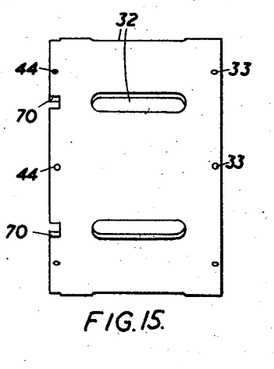

In this construction, in order to facilitate assembly, the casing 1 has a removable end plate 3a, at the right hand side in Figure 11, with which the boss 2 is integral.

In a power transmission mechanism, according to the invention, the torque produced is a function of the relative speed of the driving and driven members, in fact the torque increases in proportion to the square of said relative speed. Further, the construction permits the driving member to rotate at full speed while the driven member is held stationary under which condition the torque is a maximum, diminishing until it becomes zero when the driving and driven members are rotating at the same speed, that is to say, when their relative velocity is zero.

The maximum power, i. e., the full power output (less frictional losses) of the source of power is transmitted when the driven member is rotating at one third of the speed of the driving member. On either side of this point the power transmitted falls off, being zero when the driven member is stationary and again zero when the driven member rotates at the same speed as the driving member.

From the foregoing, it will be understood that the invention provides a speed reducing power transmission mechanism which acts as a safety coupling, preventing overload, and which will automatically adjust the transmission ratio within a considerable range of speeds.

I claim:

1. A power transmission mechanism including in combination a driving member and a driven member coaxial therewith, said driving and driven members having adjacent surfaces of revolution around each of which extends an endless track made up of a number of contiguous curved sections, subtending equal angles at the centre of revolution, the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a number of transmission members each engaging with the tracks on both surfaces.

2. A power transmission mechanism according to claim 1 wherein the transmission members are spaced apart by distances equal to the pitch of the sections of one track.

3. A power transmission mechanism including in combination a driving member and a driven member coaxial therewith, said driving and driven members having adjacent surfaces of revolution around each of which extends an endless track made up of a number of contiguous curved sections, subtending equal angles at the centre of revolution, the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a number of balls, each engaging with the tracks on both surfaces, said balls being spaced apart by distances equal to the pitch of the sections of one track.

4. A power transmission mechanism including in combination a driving member, and a driven member coaxial therewith, said driving and driven members having adjacent surfaces of revolution around each of which extends an endless track made up of a number of contiguous curved sections, subtending equal angles at the centre of revolution, the centre line of each section being a half cycloid, and the tangents to the centre lines of two contiguous sections at their junction being at right angles to one another while the tangent to the centre line of each section at one end thereof is at right angles to the generatrix of the surface of revolution, and the tangent to the centre line of each section at the other end thereof is parallel to said generatrix, said mechanism further including a number of transmission members each engaging with the tracks on both surfaces.

5. A power transmission mechanism according to claim 4 wherein the transmission members are spaced apart by distances equal to the pitch of the sections of one track.

6. A power transmission mechanism including in combination a driving member, and a driven member coaxial therewith, said driving and driven members having adjacent surfaces of revolution around each of which extends an endless track made up of a number of contiguous curved sections, subtending equal angles at the centre of revolution, the centre line of each section being a half cycloid, and the tangents to the centre lines of two contiguous sections at their junction being at right angles to one another while the tangent to the centre line of each section at one end thereof is at right angles to the generatrix of the surface of revolution and the tangent to the centre line of each section at the other end thereof is parallel to said generatrix, said mechanism further including a number of balls each engaging with the tracks on both surfaces, said balls being spaced apart by distances equal to the pitch of the sections of one groove.

7. A power transmission mechanism including in combination a driving ring and a driven ring concentric therewith, said driving and driven rings having adjacent concentric surfaces of revolution around each of which extends an endless track made up of a number of contiguous curved sections subtending equal angles at the centre of revolution, the tangents to the centre lines of two contiguous sections at their junction being at right angles to one another, while the tangent to the centre line of each section at one end thereof is at right angles to the generatrix of the surface of revolution and the tangent to the centre line of each section at the other end thereof is parallel to said generatrix, said mechanism further including a number of transmission members each engaging with the tracks on both surfaces.

8. A power transmission mechanism including in combination a driving ring and a driven ring concentric therewith, said driving and driven rings having adjacent concentric surfaces of revolution around each of which extends an endless track made up of a number of contiguous curved sections subtending equal angles at the centre of revolution, the tangents to the centre lines of two contiguous sections at their junction being at right angles to one another, while the tangent to the centre line of each section at one end thereof is at right angles to the generatrix of the surface of revolution and the tangent to the centre line of each section at the other end thereof is parallel to said generatrix, said mechanism further including a number of balls each engaging with the track on both surfaces, said balls being spaced apart by distances equal to the pitch of the sections of one track.

9. A power transmission mechanism including in combinatin a driving ring and a driven ring concentric therewith, said driving and driven rings having adjacent concentric surfaces of revolution around each of which extends an endless track made up of a number of contiguous curved sections subtending equal angles at the centre of revolution, the centre line of each section being a half cycloid, and the tangents to the centre lines of two contiguous sections at their junctions being at right angles to one another while the tangent to the centre line of each section at one end thereof is at right angles to the generaritx of the surface of revolution and the tangent to the centre line of each section at the other end thereof is parallel to said generatrix, said mechanism further including a number of transmission members each engaging with the tracks on both surfaces.

10. A power transmission mechanism including in combination a driving shaft, a driving member coaxial with said shaft, a resilient connection between said driving member and said shaft, and a driven member coaxial with said driving member, said driving and driven members having adjacent surfaces of revolution around each of which extends an endless track made up of a number of contiguous curved sections subtending equal angles at the centre of revolution, the tangents to the centre line of two contiguous sections at their junction being at right angles to one another, while the tangent to the centre line of each section at one end thereof is at right angles to the generatrix of the surface of revolution and the tangent to the centre line of each section at the other end thereof is parallel to said generatrix, said mechanism further including a number of transmission members each engaging with the tracks on both surfaces.

11. A power transmission mechanism including in combination a driving shaft, a driving ring concentric with said shaft, a resilient connection between said driving ring and said shaft, a driven ring concentric with said driving ring, said driving and driven rings having adjacent concentric surfaces of revolution around each of which extends an endless track made up of a number of contiguous curved sections subtending equal angles at the centre of revolution, the centre line of each section being a half cycloid, and the tangents to the centre lines of two contiguous sections at their junction being at right angles to one another while the tangent to the centre line of each section at one end thereof is at right angles to the generatrix of the surface of revolution and the tangent to the centre line of each section at the other end thereof is parallel to said generatrix, said mechanism further including a number of transmission members each engaging with the tracks on both surfaces.

12. A power transmission mechanism including in combination a driving shaft, a driving ring concentric with said shaft, a resilient connection between said driving ring and said shaft, a driven ring concentric with said driving ring, said driving and driven rings having adjacent concentric surfaces of revolution around each of which extends an endless track made up of a number of contiguous curved sections subtending equal angles at the centre of revolution, the centre line of each section being a half cycloid, and the tangents to the centre lines of two contiguous sections at their junction being at right angles to one another while the tangent to the centre line of each section at one end thereof is at right angles to the generatrix of the surface of revolution and the tangent to the centre line of each section at the other end thereof is parallel to said generatrix, said mechanism further including a number of balls each engaging with the tracks on both surfaces, said balls being spaced apart by distances equal to the pitch of the sections of one track.

13. A power transmission mechanism including in combination a driving shaft, a driving member coaxial therewith, a resilient connection between said driving member and said shaft, and a driven member coaxial with said driving member said driving and driven members having adjacent surfaces of revolution around each of which extends an endless track made up of a number of contiguous curved sections, subtending equal angles at the centre of revolution the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a number of transmission members each engaging with the tracks on both surfaces, and a spring-loaded catch element disposed in each section adjacent its junction with the next section to prevent retrograde movement of the transmission member at said junction.

14. A power transmission mechanism including in combination a driving shaft, a driving ring concentric with said shaft, a resilient connection between said driving ring and said shaft, a driven ring concentric with said driving ring, said driving and driven rings having adjacent concentric surfaces of revolution around each of which extends an endless track made up of a number of contiguous curved sections subtending equal angles at the centre of revolution, the centre line of each section being a half cycloid, and the tangents to the centre lines of two contiguous sections at their junction being at right angles to one another while the tangent to the centre line of each section at one end thereof is at right angles to the generatrix of the surface of revolution and the tangent to the centre line of each section at the other end thereof is parallel to said generatrix, said mechanism further including a number of balls each engaging with the tracks on both surfaces, said balls being spaced apart by distances equal to the pitch of the sections of one track, and a spring loaded catch element disposed in each track section adjacent its junction with the next section to prevent retrograde movement of the ball at said junction.

15. A power transmission mechanism including in combination a driving member and a driven member co-axial therewith, said driving and driven members having adjacent surfaces of revolution around each of which extends an endless track made up of a number of contiguous curved sections, subtending equal angles at the centre of revolution, the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a cage disposed between the driving and driven members, said cage being coaxial with and rotatable relatively to said members and having transverse slots therein, a transmission member freely mounted in each of said slots and each of said transmission members engaging with the tracks on the surfaces of revolution of the driving and driven members, and a weight element on said cage to increase its mass.

16. A power transmission mechanism including in combination a driving member and a driven member coaxial therewith, said driving and driven members having adjacent surfaces of revolution around each of which extends an endless track made up of a number of contiguous curved sections, subtending equal angles at the centre of revolution the centre line of each section being a half cycloid, and the tangents to the centre lines of two contiguous sections at their junction being at right angles to one another while the tangent to the centre line of each section at one end thereof is at right angles to the generatrix of the surface of revolution and the tangent to the centre line of each section at the other end thereof is parallel to said generatrix, said mechanism further including a cage disposed between the driving and driven members, said cage being coaxial with and rotatably relatively to said members and having transverse slots formed in its periphery, at distances apart equal to the pitch of the track sections, and a ball freely mounted in each slot, each of said balls engaging with the tracks in the surfaces of revolution of the driving and driven members, and a weight element on said cage to increase its mass.

17. A power transmission mechanism including in combination a driving shaft, a driving ring concentric with said shaft, a resilient connection between said driving ring and said shaft, a driven ring concentric with said driving ring, said driving and driven rings having concentric surfaces of revolution around each of which extends an endless track made up of a number of contiguous curved sections subtending equal angles at the centre of revolution, the centre line of each section being a half cycloid, and the tangents to the centre lines of two contiguous sections at their junction being at right angles to one another while the tangent to the centre line of each section at one end thereof is at right angles to the generatrix of the surface of revolution and the tangent to the centre line of each section at the other end thereof is parallel to said generatrix, said mechanism further including an annular cage disposed concentrically between the concentric surfaces of revolution of said driving and driven rings, and said cage having transverse slots formed therein, at distances apart equal to the track sections, a ball freely mounted in each slot and each of said balls engaging both with the tracks on the surface of revolution of the driving ring and with the track on the surface of revolution of the driven ring, and a weight element on said cage to increase its mass.

18. A power transmission mechanism including in combination a driving member and a driven member coaxial therewith, said driving and driven members having adjacent surfaces of revolution around each of which extends an endless track made up of a number of contiguous curved sections, subtending equal angles at the centre of revolution, the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a cage disposed between the driving and driven members, said cage being coaxial with and rotatable relatively to said members and having transverse slots formed in its periphery at distances apart equal to the pitch of the track sections, a transmission member freely mounted in each slot, each of said transmission members engaging with the tracks on the surfaces of revolution of the driving and driven members, a plurality of equally spaced weights mounted on said cage for radial movement relative thereto, and means for varying the radial positions of said weights.

19. A power transmission mechanism according to claim 18 wherein the means for varying the radial positions of the weights includes a first disc freely mounted on the driving shaft, and formed with a plurality of radial slots, means connecting said disc to the cage, a second disc freely mounted on the driving shaft in juxtaposition to said first disc and formed with a plurality of cam slots corresponding in number and spacing to said radial slots, a pin passing through each cam slot and also through its corresponding radial slot, a weight secured to said pin and means for turning said second disc relatively to said first disc.

20. A power transmission mechanism including in combination a driving member and a driven member coaxial therewith, said driving and driven members having adjacent surfaces of revolution around each of which extends an endless track made up of a number of contiguous curved sections, subtending equal angles at the centre of revolution, the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a cage disposed between the driving and driven members, said cage being coaxial with and rotatable relatively to said members and having transverse slots formed in its periphery at distances apart equal to the pitch of the track sections, a roller freely mounted in each slot, two pins projecting coaxially, one from each face of said roller, a second roller freely mounted on one of said pins and engaging with the track in the driving member and a third roller freely mounted on the other of said pins and engaging with the track in the driven member.

21. A power transmission mechanism including in combination a driving shaft, a driving member coaxial therewith, a resilient connection between said driving member and said shaft, and a driven member coaxial with said driving member, said driving and driven members having adjacent surfaces of revolution around each of which extends an endless track made up of a number of contiguous curved sections, subtending equal angles at the centre of revolution, the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a cage disposed between the driving and driven members, said cage being coaxial with and rotatable relatively to said members and having transverse slots therein, a transmission member freely mounted in each of said slots and each of said transmission members engaging with the tracks on the surfaces of revolution of the driving and driven members, a weight element on said cage, and a spring-loaded catch element in each track section adjacent its junction with the next section.

22. A power transmission mechanism including in combination a driving shaft, a driving member coaxial therewith, a resilient connection between said driving member and said shaft, and a driven member coaxial with said driving member, said driving and driven members having adjacent surfaces of revolution around each of which extends an endless track made up of a number of contiguous curved sections, subtending equal angles at the centre of revolution, the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a cage disposed between the driving and driven members, said cage being coaxial with and rotatable relatively to said members and having transverse slots formed in its periphery at distances apart equal to the pitch of the track sections, a transmission member freely mounted in each slot, each of said transmission members engaging with the tracks on the surfaces of revolution of the driving and driven members, a plurality of equally spaced weights mounted on said cage for radial movement relative thereto, and means for varying the radial positions of said weights.

23. A power transmission mechanism including in combination a driving member and a driven member coaxial therewith, said driving and driven members having adjacent surfaces of revolution around each of which extends an endless track made up of a number of contiguous curved sections, subtending equal angles at the centre of revolution, the tangents to the centre lines of two contiguous sections at their junction being at right angles to one another, while the tangent to the centre line of each section at one end thereof is at right angles to the generatrix of the surface of revolution, and the tangent to the centre line of each section at the other end thereof is parallel to said generatrix, said mechanism further including a cage disposed between the driving and driven members, said cage being coaxial with and rotatable relatively to said members, a plurality of transmission members freely mounted in said cage and each engaging with the tracks on the surfaces of revolution of the driving and driven members.

ADOLPHE EWALD GULL.

REFERENCES CITED

The following references are of record in the file of this patent:

UNITED STATES PATENTS

| Number | Name | Date |
| --- | --- | --- |
| 1,688,785 | Chalmers | Oct. 23, 1928 |
| 2,275,725 | Broady | Mar. 10, 1942 |

FOREIGN PATENTS

| Number | Country | Date |
| --- | --- | --- |
| 550,940 | France | Mar. 23, 1923 |